Sept. 12, 1967      O. Q. TAYLOR      3,341,165
AUTOMATIC LEVELING SEAT FOR TRACTORS AND THE LIKE
Filed Sept. 8, 1965
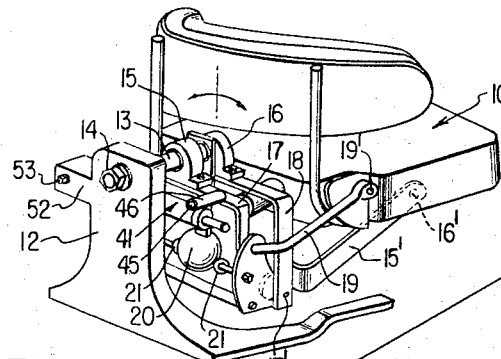
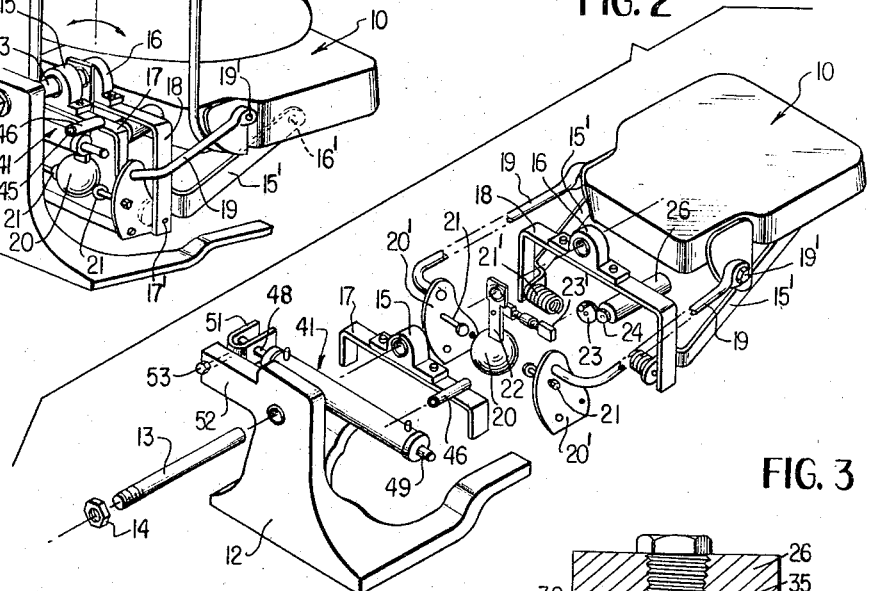
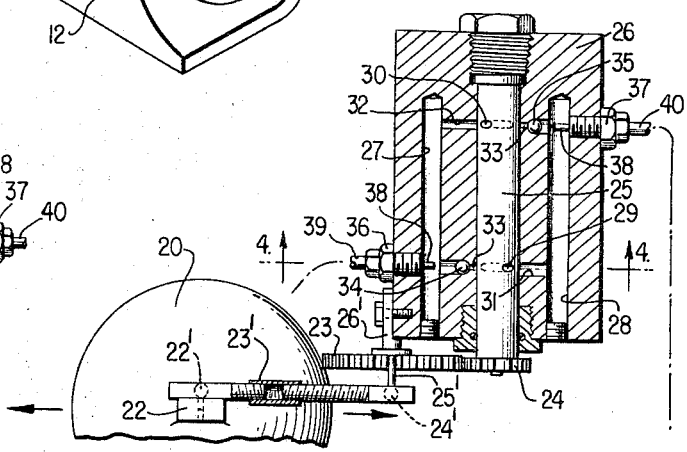
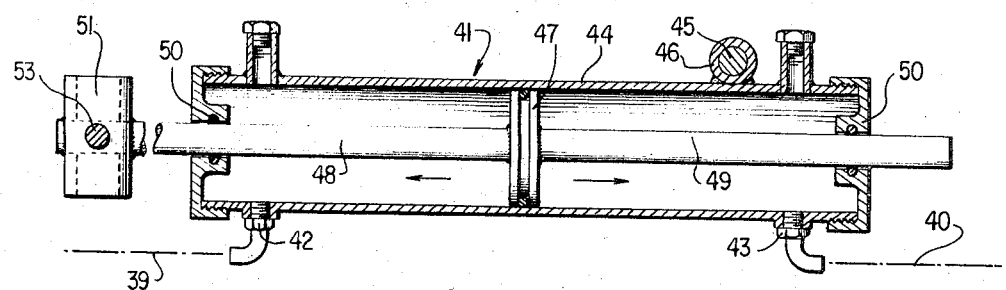
INVENTOR
ORA QUINTON TAYLOR
BY *B. P. Fishburne, Jr.*
ATTORNEY

AUTOMATIC LEVELING SEAT FOR TRACTORS AND THE LIKE

Ora Quinton Taylor, Rte. 3, Trenton, Tenn. 38382
Filed Sept. 8, 1965, Ser. No. 485,719
3 Claims. (Cl. 248—376)

This application is a continuation-in-part of my prior copending application Ser. No. 453,382, filed May 5, 1965, for Self-Leveling Seat for Tractors.

This invention relates to a self-leveling seat for tractors and the like.

Tractors having automatic or semi-automatic seat leveling means are known in the prior art. Examples are in United States Patents 2,572,910, Brown, and 2,966,937, Rydberg. These prior patents and others along similar lines show mechanisms for leveling the tractor seat when one wheel of the tractor is in a ditch or furrow. These prior art devices have not proven to be entirely practical, mainly because of complicated construction and excessive expense to manufacture and install on standard tractors. Frequently, it has been necessary to alter substantially the seat structure and to provide for the mounting of special motors, fluid pumps and the like.

Accordingly, it is the object of the present invention to improve upon prior art devices through the provision of a hydraulically controlled self-leveling tractor seat which is highly simplified in construction and operation, very economical to manufacture and install on a conventional farm tractor, and which is substantially free of complex mechanisms likely to fail or give trouble during use.

Another object is to provide a self-leveling seat structure which can be placed on the market in the form of a simple attachment kit readily installable upon new or existing tractors.

A further object is to provide a self-leveling tractor seat structure which takes advantage of gravity and the weight of the tractor driver on the seat to pressurize the simple hydraulic system and to actuate the simple control means, thereby eliminating the need for auxiliary motors, pumps and other mechanical or electrical equipment.

Other objects and advantages of the invention will be apparent during the course of the following detailed description.

The invention herein comprises a support including a seat suspension member. A seat structure is suspended pivotally from the member for pendulum-like lateral tilting. A closed fluid-filled circuit has a single cylinder-piston fluid displacement unit connected therein together with a control valve which is in series with the displacement unit in said circuit. A pendulum weight actuator for the control valve hangs from the suspension member independently of the seat structure, whereby tilting of the tractor will cause the pendulum weight actuator to operate the control valve and cause fluid in said circuit to be displaced in the proper direction to level the seat structure, the weight on the seat structure supplying the operating force to pressurize the fluid-filled circuit and operate the cylinder-piston fluid displacement unit.

In the accompanying drawings forming a part of this application and in which like numerals are employed to designate like parts throughout the same, FIGURE 1 is a perspective view of a self-leveling seat for tractors embodying the invention;

FIGURE 2 is an exploded perspective view of the invention, with parts broken away and parts omitted;

FIGURE 3 is a central vertical longitudinal section through a hydraulic control valve and associated elements;

FIGURE 4 is a transverse vertical section taken on line 4—4 of FIGURE 3; and

FIGURE 5 is a central vertical longitudinal section through a double-acting power-transmitting cylinder piston unit.

In the drawings, wherein for the purpose of illustration is shown a preferred embodiment of the invention, the numeral 10 designates a well known type of tractor seat whose basic construction remains unaltered in connection with the present invention. The seat 10 may, for example, be the standard tractor seat on Model #150 or Model #165 Farm Tractor manufactured by Massey-Ferguson, Inc., Detroit, Mich.

In accordance with the invention, a rigid mounting bracket or head 12 is suitably connected to the tractor frame, not shown, and forms the support for a fixed horizontal mounting shaft 13, rigidly and adjustably secured thereto at 14. The axis of the shaft 13 is spaced substantially above the elevation of the seat 10, preferably about seven inches thereabove.

The entire tractor seat structure including the hydraulic control means to be described is rockably suspended from the relatively stationary shaft 13. Toward this end, a pair of spaced bearings 15 and 16 are freely pivotally mounted upon the shaft 13 in spaced relation and are attached to conventional seat bracket parts 17 and 18 forming portions of the standard seat assembly. The standard seat assembly further includes lower bracket arms 15' having their forward upper ends pivoted to the seat proper as indicated at 16' and having their lower rear ends pivoted at 17' to the bottom of bracket part 18. Additional stabilizer links 19 have their forward ends pivoted to the seat 10 at 19' and have their rear ends pivoted to plates 20' which are rigid with the bracket part 17 by welding or the like. The conventional seat structure also includes a coil spring 21' for resiliently supporting the tractor driver. The conventional seat structure constitutes a form of parallelogram support, whereby the driver on the seat is cushioned against shocks and may move up and down within limits. It is thought to be unnecessary to further describe the conventional seat structure herein.

The invention mechanism further comprises a pendulum weight 20, pivotally suspended from the portion of the shaft 13 which is between the bearings 15 and 16. The swinging movement of this weight in either direction may be regulated and limited by a pair of opposed screw stops 21 mounted on the plates 20'. The pendulum weight 20 includes a vertical strap 22, directly connected with the shaft 13. Pivoted to the strap 22 intermediate its ends by preferably a ball and socket type connection 22' is an adjustable length connecting link 23' having right and left hand screw-threaded parts as shown in FIGURE 3. This connecting link 23' has its other end connected by a ball and socket type connection 24' with a pin 25', welded to a relatively large gear 23, rotatable upon a short shaft 26', rigidly secured to one side of a control valve casing 26.

The gear 23 is in constant mesh with a smaller gear 24 rigidly secured to one end of a cylindrical rotatable valve element 25, journaled within the control valve casing 26. The casing 26 is rigidly secured in any suitable manner as by bolting to the adjacent seat bracket part 18 carrying the bearing 16, FIGURE 2. It will be understood that relative pivoting can occur between the pendulum weight 20 and the seat structure including bracket parts 17 and 18 on the support shaft 13. When the pendulum weight 20 swings upon the shaft 13, it will directly cause turning of the larger gear 23 of an approximately 2-to-1 ratio gear train including the smaller gear 24, by virtue of the connecting link 23' which moves bodily. Swinging of the pendulum weight in either direction will therefore cause some turning of the gears 23 and 24 and therefore some rotation of the valve element 25.

The valve casing 26 has a pair of parallel longitudinal passages 27 and 28 on opposite sides of the main bore containing the valve element 25. Near its opposite ends, the valve element 25 has diametrically extending cross ports 29 and 30 extending therethrough and spaced circumferentially ninety degrees apart, as best shown in FIGURE 4. Upon turning of the valve element 25 by the gear 24 in one direction or the other forty-five degrees from the neutral positions shown in FIGURES 3 and 4, one or the other of the ports 29 and 30 is aligned with a cross passage 31 or 32 of the casing 26. As shown in FIGURE 3, the cross passages 31 and 32 communicate with the longitudinal passages 28 and 27, respectively. On opposite sides of the valve element 25, the cross passages have reduced diameter portions 33 forming seats for one-way acting ball check valve elements 34 and 35, as shown. Hydraulic fittings 36 and 37 on the casing 26 have pin extensions 38 which prevent the ball elements 34 and 35 from escaping into the longitudinal bores 27 and 28.

Flexible hydraulic lines or hoses 39 and 40 lead from the fittings 36 and 37 and extend to the opposite ends of a double-acting cylinder-piston unit 41, which has fittings 42 and 43 connected with the hoses 39 and 40. The cylinder 44 of unit 41 has one end portion pivotally suspended from the bracket part 17, FIGURE 2, by a hinge pin 45, rotatable within a sleeve 46 which may be welded to the top of cylinder 44, the pin being rigid with the bracket part 17. The cylinder 44 contains a central double-acting piston 47 having rod ends 48 and 49 extending slidably through sealed openings of cylinder end caps 50, as shown in FIGURE 5. The rod end 48 has rigidly secured thereto exteriorly of the cylinder a U-shaped pivot yoke 51, having pivotal connection with an extension 52 of the mounting bracket 12 through a suitable bolt or pin 53. The yoke 51 and rod end 48 in effect support the end of the cylinder 44 remote from the hinge pin 45 and the bracket extension 52 supports the yoke 51, in turn. The unit 41 is thus capable of some pivoting on the axis of the hinge pin 45 and the pivot bolt 53 to compensate for movement of the piston 47 within the cylinder.

The operation of the self-leveling tractor seat is as follows.

When the tractor is on level ground, the pendulum weight 20 is in a neutral position and the valve element 25 is in the neutral position shown in FIGURES 3 and 4 and no fluid in the closed system can flow from either end of the cylinder 44 to the ports 27 and 28 or from one such port to the other because the ports 29 and 30 are out of registry with the cross passages 31 and 32. The piston 47 is thus hydraulically locked in the neutral position shown in FIGURE 5 and there is no relative movement possible between the piston and cylinder 44. At this time, the hydraulically locked cylinder-piston unit 41 prevents the tractor seat 10 from pivoting on the axis of the supporting shaft 13, because the cylinder-piston unit is then rigidly interconnecting the main bracket 12 with the supporting bracket structure of the seat including the part 17.

When the tractor tilts due to one wheel entering a furrow or ditch, the pendulum weight 20 will immediately swing in one direction or the other by gravity, dependent upon the direction of tilt. The screw stops 21 limit the extent of movement of the pendulum weight. This movement or swinging of the pendulum weight will cause turning in one direction or the other of the ported valve element 25 through the gears 23 and 24 and the link 23'. This action will serve to align one of the ports 29 or 30 with one of the cross passages 31 or 32 of the valve casing, and will thereby allow fluid to circulate in the closed system from one end of the cylinder 44, through the flexible hose connected therewith, to one longitudinal passage 27 or 28 and then to the other longitudinal passage of the valve casing, through the particular cross port which is aligned with the port of the valve element 25.

As this action takes place, the weight of the rider on the seat 10 causes the seat to turn or pivot on the shaft 13 and this action is rendered possible since the cylinder-piston unit 41 is now hydraulically unlocked for relative movement in one direction. It is the weight of the individual on the seat 10 which pressurizes the fluid system and causes the relative axial movement of the piston 47 and cylinder 44 in one direction to bring the seat 10 to a new level position. No auxiliary pumps, motors or the like are required in connection with the closed hydraulic system which is self-pressurizing under the weight of the rider on the seat 10 and and controlled by the turning of the valve element 25 to either lock the unit 41 or release it for movement in one of the two directions shown by the arrows in FIGURE 5. The direction of movement of the piston 47 within the cylinder 44 and consequently the direction in which the seat 10 will be allowed to pivot on the shaft 13 to seek a level position will all depend upon which of the respective ports 29 or 30 is aligned with one of the cross passages 31 and 32 and this depends upon the direction of turning of valve element 25 and the direction in which the tractor is tilted. In essence, the system is simply a closed hydraulic circuit which in a neutral position of the control valve element 25 will lock the seat in a level position but which is responsive automatically to tilting of the tractor in either direction to unlock the hydraulic system and allow fluid to circulate in one direction only in the system to in turn permit corrective movement of the seat upon the axis of shaft 13.

It is believed that the extreme simplicity of the device and its automatic operation for leveling the tractor seat and the economies in the construction will now be readily apparent to those skilled in the art without the necessity for any further description.

It is to be understood that the form of the invention herewith shown and described is to be taken as a preferred example of the same, and that various changes in the shape, size and arrangement of parts may be resorted to, without departing from the spirit of the invention and scope of the subjoined claims.

Having thus described my invention, I claim:

1. A self-leveling seat for tractors and the like comprising a main mounting bracket, a supporting shaft on said bracket projecting horizontally beyond one side thereof, a seat structure rotatably suspended from said shaft for tilting movement laterally in either direction on the axis of said shaft, the center of gravity of said seat being spaced below the axis of said shaft, a cylinder-piston unit extending transversely of said shaft and including a cylinder and a single double-acting piston therein having piston rod extensions projecting through the ends of said cylinder, means forming a pivotal connection between said cylinder and seat structure, means forming another pivotal connection between one piston rod extension and said main mounting bracket, a control valve casing rigidly mounted upon the seat structure and having a pair of passages, flexible hydraulic lines interconnecting said passages with the ends of said cylinder on opposite sides of said single piston, a rotary valve element in said valve casing having a pair of angularly spaced cross ports, said valve casing having a pair of cross passages interconnecting said first-named passages and each adapted for alignment with one of said cross ports to complete a hydraulic circuit in one direction only with said cylinder-piston unit, opposed check valve means in said cross passages of the valve casing on opposite sides of the valve element, a pendulum weight suspended pivotally from said shaft, and gearing interconnecting said weight and rotary valve element.

2. The invention as defined by claim 1, and wherein said angularly spaced cross ports are spaced approximately ninety degrees apart and are also spaced axially of the rotary valve element, whereby rotation of the valve element approximately forty-five degrees in either direction will always cause registry of one of said cross ports with one of said cross passages of the valve casing.

3. The invention as defined by claim 1, and wherein said gearing includes a first gear on one end of the rotary valve element, a second gear meshing therewith and having a larger diameter than the first gear, and an operative connection between the second gear and said pendulum weight, whereby movement of the latter in either direction on the axis of said supporting shaft will impart rotation in one direction to said rotary valve element.

References Cited
UNITED STATES PATENTS

| | | | |
|---|---|---|---|
| 1,086,561 | 2/1914 | Ritz-Woller | 137—45 X |
| 2,093,144 | 9/1937 | Brunell | 137—45 |
| 2,520,266 | 8/1950 | Adams | 37—153 |
| 2,684,254 | 7/1954 | Goss | 280—112 |
| 2,984,290 | 5/1961 | Miller | 248—373 X |
| 3,021,107 | 2/1962 | Salo | 248—376 |

ROY D. FRAZIER, *Primary Examiner.*

CLAUDE A. LE ROY, *Examiner.*

R. P. SEITTER, *Assistant Examiner.*